(12) United States Patent
Kishi et al.

(10) Patent No.: US 11,335,511 B2
(45) Date of Patent: May 17, 2022

(54) CERAMIC LAMINATE INCLUDING A PROTRUSION AND MULTILAYER CERAMIC CAPACITOR

(71) Applicant: Murata Manufacturing Co., Ltd., Nagaokakyo (JP)

(72) Inventors: Kotaro Kishi, Nagaokakyo (JP); Takashi Sawada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 124 days.

(21) Appl. No.: 16/740,716

(22) Filed: Jan. 13, 2020

(65) Prior Publication Data
US 2020/0152392 A1   May 14, 2020

Related U.S. Application Data

(62) Division of application No. 15/857,687, filed on Dec. 29, 2017, now Pat. No. 10,573,466.

(30) Foreign Application Priority Data

Jan. 4, 2017   (JP) .............................. JP2017-000217

(51) Int. Cl.
*H01G 4/30* (2006.01)
*H01G 4/012* (2006.01)
*H01G 4/12* (2006.01)
*H01G 4/248* (2006.01)
*H01G 4/008* (2006.01)
*H01G 4/232* (2006.01)

(52) U.S. Cl.
CPC ........... *H01G 4/308* (2013.01); *H01G 4/0085* (2013.01); *H01G 4/012* (2013.01); *H01G 4/12* (2013.01); *H01G 4/232* (2013.01); *H01G 4/248* (2013.01); *H01G 4/30* (2013.01); *H01G 4/008* (2013.01)

(58) Field of Classification Search
CPC ...... H01G 4/008; H01G 4/0085; H01G 4/012; H01G 4/12; H01G 4/232; H01G 4/248; H01G 4/30; H01G 4/308
See application file for complete search history.

(56) References Cited

U.S. PATENT DOCUMENTS

| | | | |
|---|---|---|---|
| 8,687,344 B2* | 4/2014 | Akazawa | H01G 4/005 361/303 |
| 9,060,461 B2* | 6/2015 | Sawada | H01G 2/06 |
| 10,176,923 B2* | 1/2019 | Asai | H01G 4/30 |
| 2012/0229949 A1* | 9/2012 | Kim | H01G 4/12 361/321.2 |

OTHER PUBLICATIONS

Kishi et al., "Method of Manufacturing Multilayer Ceramic Capacitor", U.S. Appl. No. 15/857,687, filed Dec. 29, 2017.

* cited by examiner

*Primary Examiner* — Minh N Trinh
(74) *Attorney, Agent, or Firm* — Keating & Bennett, LLP

(57) ABSTRACT

A multilayer ceramic capacitor includes a laminate including ceramic layers and internal electrode layers arranged in a stacking direction, and two or more exposure regions at which the internal electrode layers and the ceramic layer interposed between the internal electrode layers are both exposed. The laminate has a rectangular parallelepiped configuration or shape and includes two longitudinal end surfaces, and four surfaces orthogonal to the end surfaces. On at least one of the four surfaces, the laminate includes a protrusion in which the exposure region protrudes outward.

3 Claims, 7 Drawing Sheets

CERAMIC LAMINATE INCLUDING A PROTRUSION AND MULTILAYER CERAMIC CAPACITOR

CROSS REFERENCE TO RELATED APPLICATIONS

This application claims the benefit of priority to Japanese Patent Application No. 2017-000217 filed on Jan. 4, 2017. The entire contents of this application are hereby incorporated herein by reference.

BACKGROUND OF THE INVENTION

1. Field of the Invention

The present invention relates to a method of manufacturing a multilayer ceramic capacitor, a ceramic laminate, and a multilayer ceramic capacitor.

2. Description of the Related Art

In the case of forming an external electrode on a multilayer ceramic capacitor, there has been a known method of producing the external electrode by applying a conductive paste onto a surface of a laminate of a ceramic layer and an electrode layer, which serves as an element body. As a method of applying the conductive paste onto the surface of the laminate, there has been disclosed a method of bringing a paste wheel (transfer jig), including a groove for the conductive paste, into abutment against the surface of the laminate fixed with a carrier tape to transfer the conductive paste (For example, Japanese Patent Application Laid-Open No. 2001-167989).

However, in the method described in Japanese Patent Application Laid-Open No. 2001-167989, defects such as pores, pinholes, and through holes occur at times when the transferred conductive paste is fired. FIGS. 7A and 7B are diagrams schematically showing a conventional technique of transferring a conductive paste to a surface of a laminate by using a transfer jig having a groove.

As shown in FIG. 7A, in a method of filling the conductive paste in the groove of the transfer jig and scraping off an excessive paste with a squeegee or other suitable device, the center of a conductive paste 420 filled in a groove of the transfer jig 410 is sometimes recessed. In this case, as shown in FIG. 7B, a gap 440 is formed between the conductive paste 420 and a laminate 430 at the time of transfer, which sometimes causes defects.

SUMMARY OF THE INVENTION

Preferred embodiments of the present invention provide methods of manufacturing multilayer ceramic capacitors in which defects, such as air bubbles, pinholes, and through holes, are not likely to occur in an external electrode.

A method of manufacturing a multilayer ceramic capacitor according to a preferred embodiment of the present invention includes a laminate preparation step of preparing a laminate including a plurality of ceramic layers and a plurality of internal electrode layers arranged in a stacking direction and including two or more exposure regions at which the plurality of internal electrode layers and the ceramic layer interposed between the internal electrode layers are both exposed and a transfer step of transferring a first conductive paste to the laminate. In this manufacturing method, the laminate has a rectangular or substantially rectangular parallelepiped shape including two end surfaces, which are longitudinal end surfaces, and four surfaces orthogonal or substantially orthogonal to the end surfaces and includes, on at least one of the four surfaces, a protrusion in which the exposure region protrudes outward, in the transfer step, the first conductive paste is applied to a transfer jig including a groove, and the first conductive paste in the groove is transferred to a surface of the protrusion.

In a method of manufacturing a multilayer ceramic capacitor according to a preferred embodiment of the present invention, the transfer jig is preferably a roller.

A method of manufacturing a multilayer ceramic capacitor according to a preferred embodiment of the present invention includes a laminate preparation step of preparing a laminate including a plurality of ceramic layers and a plurality of internal electrode layers arranged in a stacking direction and including two or more exposure regions at which the plurality of internal electrode layers and the ceramic layer interposed between the internal electrode layers are both exposed, an application step of applying a second conductive paste onto the laminate, and a transfer step of transferring a first conductive paste to the laminate. In this manufacturing method, the laminate has a rectangular or substantially rectangular parallelepiped shape including two end surfaces, which are longitudinal end surfaces, and four surfaces orthogonal or substantially orthogonal to the end surfaces and includes, on each of two opposing surfaces of the four surfaces, a protrusion in which the exposure region protrudes outward, in the application step, the second conductive paste is applied onto two surfaces orthogonal or substantially orthogonal to the surface including the protrusion, in the transfer step, the first conductive paste is applied to a transfer jig including a groove, and the first conductive paste in the groove is transferred to a surface of the protrusion.

In a method of manufacturing a multilayer ceramic capacitor according to a preferred embodiment of the present invention, preferably, in the transfer step, the first conductive paste is transferred to the surface including the protrusion so as to connect the second conductive pastes, existing on the two opposing surfaces, with each other, wherein the four surfaces orthogonal or substantially orthogonal to the end surfaces of the laminate are annularly covered with the second conductive paste and the first conductive paste.

In a method of manufacturing a multilayer ceramic capacitor according to a preferred embodiment of the present invention, preferably, in the application step, the second conductive paste is applied so as to protrude from a surface, orthogonal or substantially orthogonal to the surface including the protrusion, to the surface including the protrusion, and the second conductive paste and the first conductive paste are brought into contact with each other on the surface including the protrusion, wherein the four surfaces orthogonal or substantially orthogonal to the end surfaces of the laminate are annularly covered with the second conductive paste and the first conductive paste.

In a method of manufacturing a multilayer ceramic capacitor according to a preferred embodiment of the present invention, preferably, the second conductive paste is in contact with the internal electrode layer at the protrusion.

A ceramic laminate according to a preferred embodiment of the present invention includes a rectangular or substantially rectangular parallelepiped laminate including a plurality of ceramic layers and a plurality of internal electrode layers arranged in the stacking direction and including two or more exposure regions at which the plurality of internal electrode layers and the ceramic layer interposed between the internal electrode layers are both exposed. In this ceramic laminate, the laminate has a cubic or substantially cubic shape including two end surfaces, which are longitudinal end surfaces, and four surfaces orthogonal or substantially orthogonal to the end surfaces and includes, on at least one of the four surfaces, a protrusion in which the exposure region protrudes outward.

A multilayer ceramic capacitor according to a preferred embodiment of the present invention includes a rectangular or substantially rectangular parallelepiped laminate including a plurality of ceramic layers and a plurality of internal electrode layers arranged in the stacking direction and including two or more exposure regions at which the plurality of internal electrode layers and the ceramic layer interposed between the internal electrode layers are both exposed and a first external electrode covering at least a portion of the laminate. In this multilayer ceramic capacitor, the laminate has a cubic or substantially cubic shape including two end surfaces, which are longitudinal end surfaces, and four surfaces orthogonal or substantially orthogonal to the end surfaces and includes, on at least one of the four surfaces, a protrusion in which the exposure region protrudes outward, and the first external electrode covers the protrusion.

In a multilayer ceramic capacitor according to a preferred embodiment of the present invention, preferably, second external electrodes are provided respectively on two surfaces orthogonal or substantially orthogonal to the surface including the protrusion, and the first external electrode is disposed such that the second external electrodes existing on two opposing surfaces are electrically connected.

In a multilayer ceramic capacitor according to a preferred embodiment of the present invention, preferably, a portion of the second external electrode is also provided on the surface including the protrusion, and in the protrusion, the second external electrode is in contact with the internal electrode layer.

Preferred embodiments of the present invention provide methods of manufacturing multilayer ceramic capacitors in which defects, such as air bubbles, pinholes, and through holes, are not likely to occur in an external electrode.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, methods of manufacturing multilayer ceramic capacitors according to preferred embodiments of the present invention will be described.

However, the present invention is not limited to the configurations described below, and various modifications may be made without departing from the scope of the present invention. The present invention also encompasses a combination of two or more preferred embodiments of the present invention described below.

First, a non-limiting example of a multilayer ceramic capacitor obtained by methods of manufacturing multilayer ceramic capacitors according to preferred embodiments of to the present invention will be described.

Figure 1:
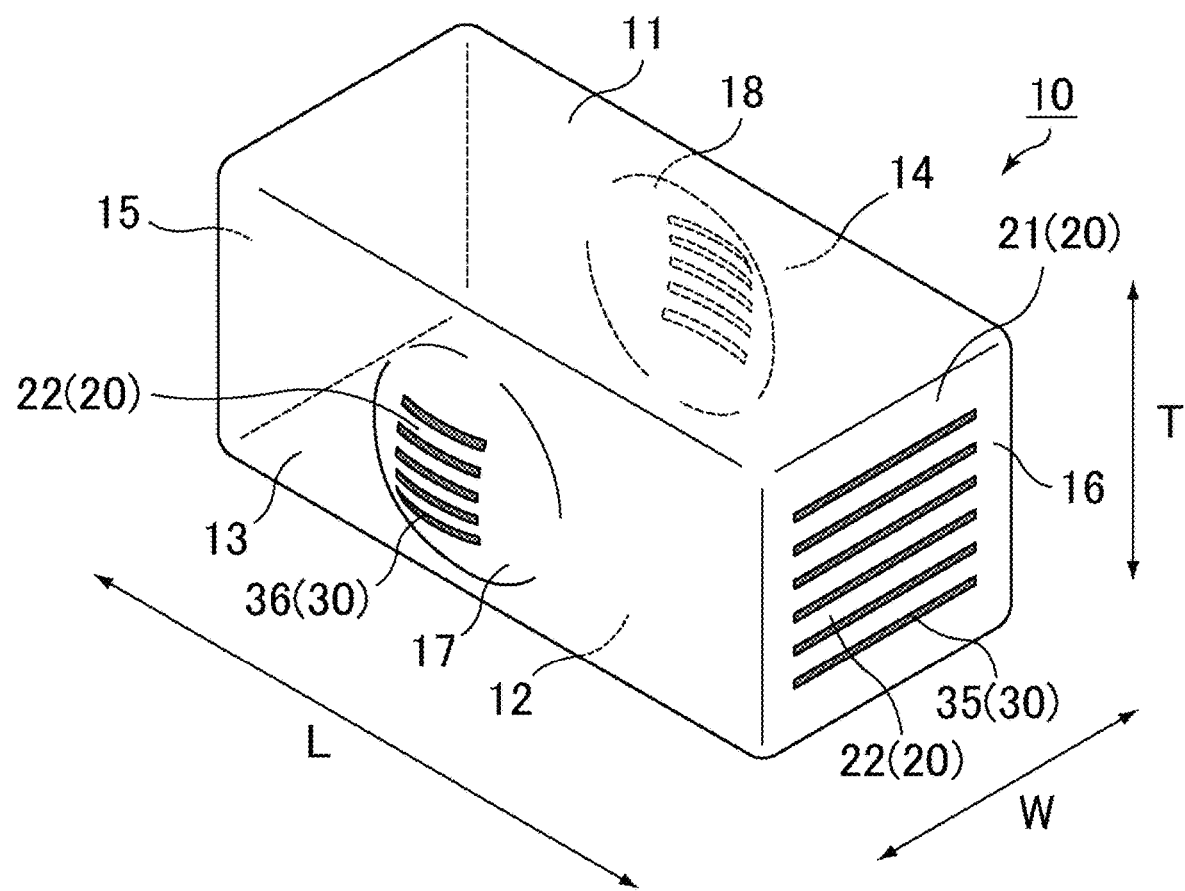
FIG. 1 is a perspective view schematically showing an example of a laminate prepared by a laminate preparation step of a method of manufacturing a multilayer ceramic capacitor according to preferred embodiment of the present invention.
Figure 2:
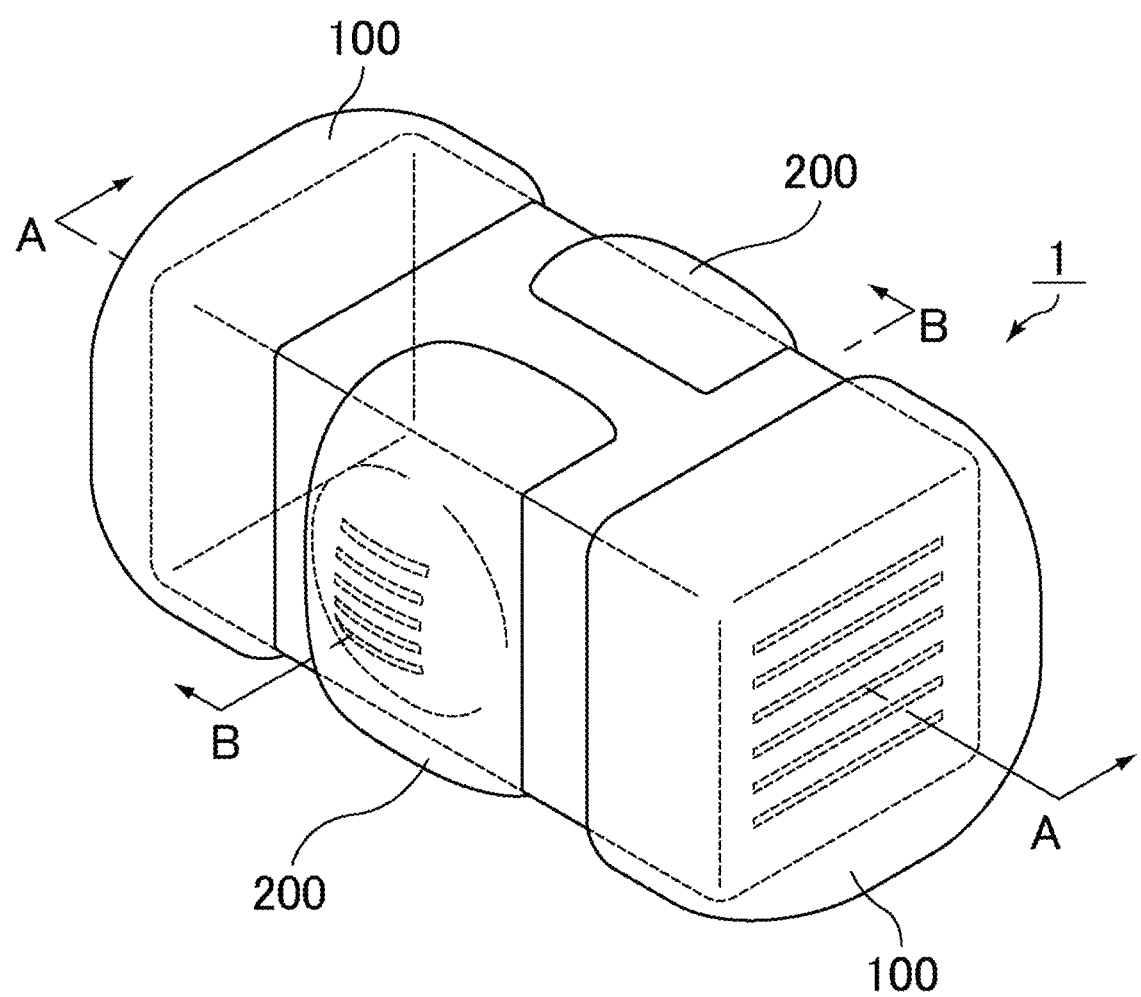
FIG. 2 is a perspective view schematically showing an example of a multilayer ceramic capacitor manufactured by a method of manufacturing a multilayer ceramic capacitor according to a preferred embodiment of the present invention

FIG. 1 is a perspective view schematically showing a non-limiting example of a laminate prepared by a laminate preparation step of a method of manufacturing a multilayer ceramic capacitor according to a preferred embodiment of the present invention. FIG. 2 is a perspective view schematically showing an example of a multilayer ceramic capacitor manufactured by a method of manufacturing a multilayer ceramic capacitor according to a preferred embodiment of the present invention.

In the laminates and the multilayer ceramic capacitors according to preferred embodiments of the present invention described in the present specification, the length direction, the width direction, and the stacking direction are defined respectively by double-headed arrows L, W, and T in a laminate 10 shown in FIG. 1 and a multilayer ceramic capacitor 1 shown in FIG. 2. Here, the length direction, the width direction, and the stacking direction are orthogonal or substantially orthogonal to each other. The stacking direction is the direction in which a plurality of ceramic layers 20 and a plurality of internal electrode layers 30 defining the laminate 10 are stacked.

The laminate 10 preferably has a rectangular or substantially rectangular parallelepiped shape including a first end surface 15 and a second end surface 16 which are longitudinal end surfaces and four surfaces orthogonal or substantially orthogonal to the first end surface 15 and the second end surface 16, and includes a plurality of stacked ceramic layers 20 and a plurality of stacked internal electrode layers 30. The four surfaces orthogonal or substantially orthogonal to the longitudinal direction include two side surfaces along the stacking direction of the laminate and two main surfaces orthogonal thereto. That is, the laminate 10 of the multilayer ceramic capacitor includes the first end surface 15 and the second end surface 16 which are the longitudinal end surfaces, a first main surface 11 and a second main surface 12 which are orthogonal or substantially orthogonal to the longitudinal end surfaces and are end surfaces in the stacking direction, and a first side surface 13 and a second side surface 14 orthogonal or substantially orthogonal to the longitudinal end surfaces and also orthogonal or substantially orthogonal to the end surfaces in the stacking direction.

In this specification, a cross section of the laminate 10 crossing the first end surface 15 and the second end surface 16 and extending along the stacking direction of the laminate 10 is referred to as an LT cross section. Further, a cross section of the laminate 10 crossing the first side surface 13 and the second side surface 14 and extending along the stacking direction of the laminate 10 is referred to as a WT cross section.

Furthermore, a cross section of the laminate 10 which crosses the first side surface 13, the second side surface 14, the first end surface 15, or the second end surface 16 and is orthogonal or substantially orthogonal to the stacking direction of the laminate 10 is referred to as an LW cross section.

The ceramic layer 20 includes outer layers 21 and an inner layer 22. The outer layers 21 are located on the first main surface 11 side and the second main surface 12 side of the laminate 10 and located between the internal electrode layers closest to one of the first main surface 11 and the second main surface 12. The inner layer 22 is a region interposed between both outer layers 21.

Exposure regions at which the second internal electrode layer 36 and the ceramic layer 20 are both exposed are provided on the first side surface 13 and the second side surface 14 of the laminate 10, respectively, and the exposure region protrudes outward from the first side surface 13 and the second side surface 14 to define protrusions 17 and 18.

As shown in FIG. 2, in the multilayer ceramic capacitor 1, the first end surface 15 and the second end surface 16 of the laminate 10 are covered with an external electrode 100, and on the first side surface 13 and the second side surface 14, the exposure region at which the second internal electrode layer 36 and the ceramic layer 20 are both exposed is covered with an external electrode 200 (first external electrode).

Subsequently, with reference to FIGS. 3A, 3B, 4A, and 4B, the ceramic layer, the internal electrode layer, the protrusion, and the external electrode defining the multilayer ceramic capacitor manufactured by a method of manufacturing a multilayer ceramic capacitor according to a preferred embodiment of the present invention will be described.

Figure 3A:
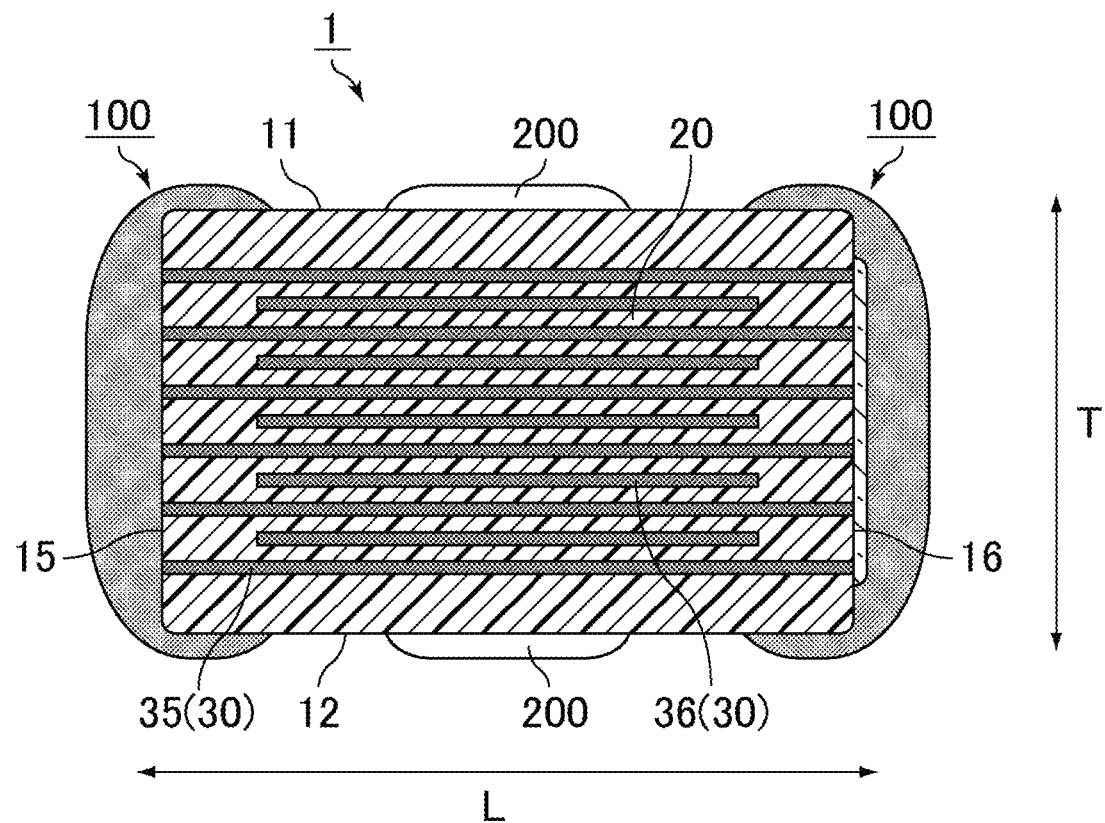
FIG. 3A is an LT cross-sectional view of a multilayer ceramic capacitor manufactured by a method of manufacturing a multilayer ceramic capacitor according to a preferred embodiment of the present invention.
Figure 3B:
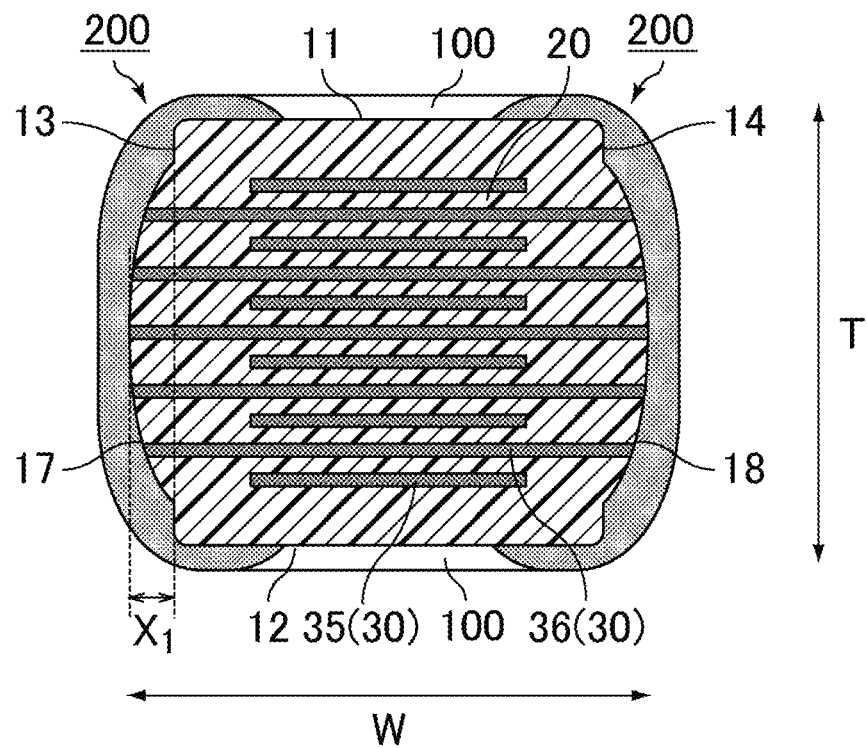
FIG. 3B is a WT cross-sectional view of a multilayer ceramic capacitor manufactured by a method of manufacturing a multilayer ceramic capacitor according to a preferred embodiment of the present invention.

FIG. 3A is an LT cross-sectional view of the multilayer ceramic capacitor manufactured by the method of manufacturing a multilayer ceramic capacitor according to a preferred embodiment of to the present invention, and is also a cross-sectional view along line A-A in FIG. 2. FIG. 3B is a WT cross-sectional view of the multilayer ceramic capacitor manufactured by the method of manufacturing a multilayer ceramic capacitor according to a preferred embodiment of the present invention, and is also a cross-sectional view along line B-B in FIG. 2.

Figure 4A:
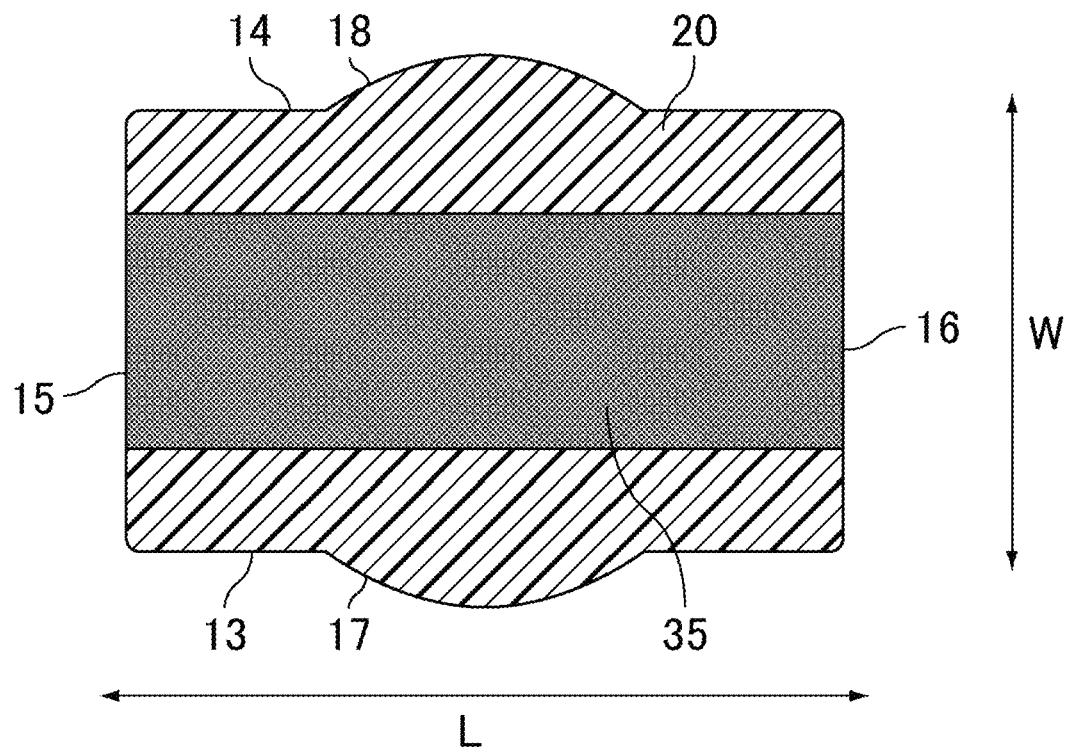
FIGS. 4A and 4B are bird's eye views schematically showing examples of a ceramic layer and an internal electrode layer which are a portion of a laminate prepared by a laminate preparation step of a method of manufacturing a multilayer ceramic capacitor according to a preferred embodiment of the present invention.
Figure 4B:
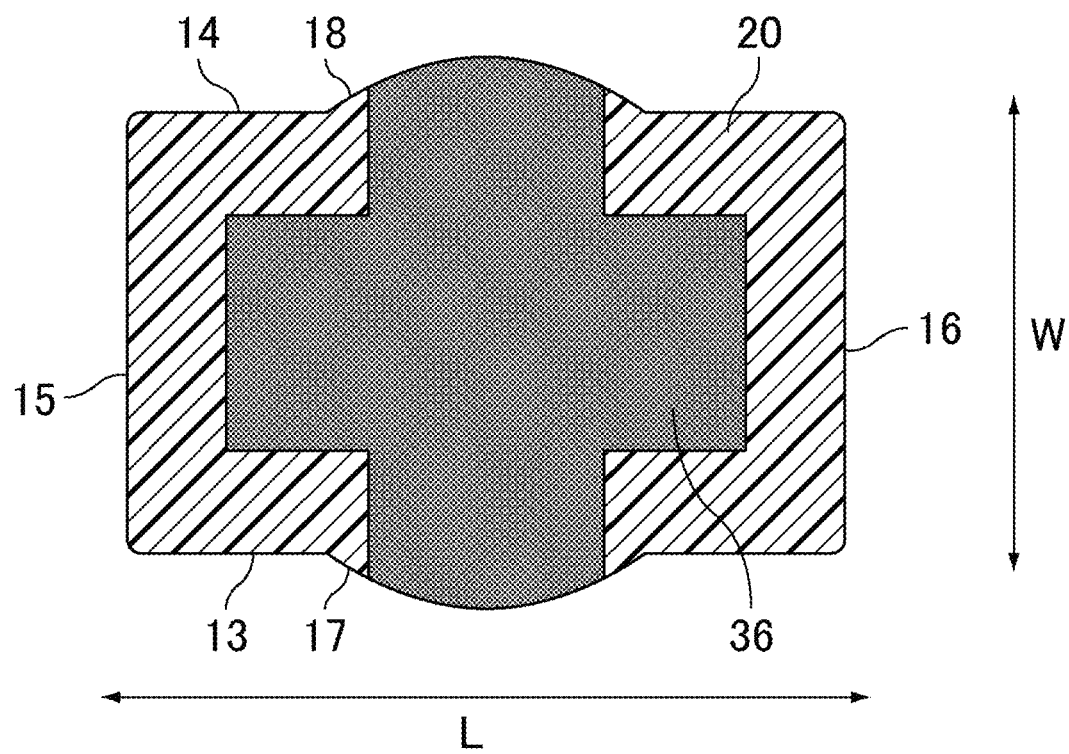

FIGS. 4A and 4B are bird's eye views schematically showing examples of the ceramic layer and the internal electrode layer which are a portion of the laminate prepared by the laminate preparation step of the method of manufacturing a multilayer ceramic capacitor according to a preferred embodiment of the present invention.

As shown in FIGS. 3A and 3B, the plurality of internal electrode layers 30 include a first internal electrode layer 35 and a second internal electrode layer 36 arranged in the stacking direction.

The first internal electrode layer 35 and the ceramic layer 20 are both exposed on both of the first end surface 15 and the second end surface 16. The second internal electrode layer 36 and the ceramic layer 20 are both exposed on both of the first side surface 13 and the second side surface 14 to define an exposure region. Electrostatic capacitance is generated at an opposing electrode portion at which the first internal electrode layer 35 and the second internal electrode layer 36 face each other with the ceramic layer 20 interposed therebetween.

As shown in FIG. 3B, the second internal electrode layer 36 and the ceramic layer 20 are both exposed on both of the first side surface 13 and the second side surface 14 to define an exposure region, and the exposure region protrudes outward to define the projections 17 and 18. The protrusion 17 protrudes from the first side surface 13 by a length indicated by a double-headed arrow $X_1$.

The protrusion is covered with the first external electrode. As the first external electrode covering the protrusion, typical external electrodes used for multilayer ceramic capacitors may be used.

As shown in FIG. 4A, the first internal electrode layer 35 preferably includes the opposing electrode portion at which the first internal electrode layer 35 and the second internal electrode layer 36 face each other with the ceramic layer 20 interposed therebetween, and an extended electrode portion extending out from the opposing electrode portion to the first end surface 15. On the first end surface 15 and the second end surface 16, the first internal electrode layer 35 is exposed. As shown in FIG. 4B, the second internal electrode layer 36 preferably includes an opposing electrode portion facing the opposing electrode portion of the first internal electrode layer 35 with the ceramic layer 20 interposed therebetween, and an extended electrode portion extending out from the opposing electrode portion to the first side surface 13 and the second side surface 14. On the first side surface 13 and the second side surface 14, an exposure region in which the second internal electrode layer 36 is exposed is provided.

In FIGS. 4A and 4B, portions corresponding to the protrusions 17 and 18 are preferably provided in advance at respective portions corresponding to the first side surface 13 and the second side surface 14. However, in the laminate preparation step in the method of manufacturing a multilayer ceramic capacitor according to a preferred embodiment of the present invention, it is not necessary that a ceramic green sheet has a shape as shown in FIGS. 4A and 4B. For example, a method of stacking a plurality of rectangular or substantially rectangular ceramic green sheets including no protrusion to form a laminate and then forming a protrusion may be used.

As the ceramic layer, a perovskite compound typified by barium titanate ($BaTiO_3$) and represented by the general formula $AmBO_3$ may preferably be used (the A site is Ba and may include, besides Ba, at least one selected from the group consisting of Sr and Ca; the B site is Ti and may include, besides Ti, at least one selected from the group consisting of Zr and Hf; O is oxygen; m is the molar ratio between the A site and the B site). A ceramic material primarily composed of calcium titanate ($CaTiO_3$), strontium titanate ($SrTiO_3$), calcium zirconate ($CaZrO_3$) or other suitable materials may preferably be used, for example. In addition, each of the ceramic layers may preferably include, for example, Mn, Mg, Si, Co, Ni, V, Al, a rare earth element or other suitable materials as a subcomponent whose content is smaller than that of the main component.

It is preferable that the internal electrode layer includes at least one selected from the group consisting of Cu, Ni, Ag, Pd, Ag—Pd alloy and Au, for example. It is also preferable that the internal electrode layer includes a dielectric material having the same or substantially the same composition as the ceramic material contained in the ceramic layer.

A description will next be made of a method, according to a preferred embodiment of the present invention, of manufacturing the above-described multilayer ceramic capacitor.

The method includes a laminate preparation step of preparing a laminate and a transfer step of transferring a first conductive paste to a protrusion of the laminate.

In the laminate preparation step, a laminate including a plurality of ceramic layers and a plurality of internal electrode layers arranged in the stacking direction is prepared.

The laminate has a rectangular or substantially rectangular parallelepiped shape including two end surfaces, which are longitudinal end surfaces, and four surfaces orthogonal or substantially orthogonal to the end surfaces, two or more exposure regions at which the internal electrode layer and the ceramic layer interposed between the internal electrode layers are both exposed.

The laminate prepared in the laminate preparation step is also a ceramic laminate according to a preferred embodiment of the present invention.

Examples of a method of preparing such a laminate include a method of stacking a predetermined number of ceramic green sheets to be ceramic layers and on which an internal electrode pattern to be an internal electrode layer is formed, compressing the laminate to form a green sheet laminate, and then compressing and firing the green sheet laminate.

For example, the ceramic green sheet may preferably be obtained by, for example, applying a ceramic slurry, mixed with ceramic to be a raw material of a ceramic layer, an organic matter, a solvent, and other suitable ingredients, onto a carrier film, such as a PET film, into a sheet by spray coating, die coating, screen printing, or other suitable method.

The thickness of the ceramic green sheet is preferably not less than about 0.4 µm and not more than about 3.0 µm, for example.

The same ceramic as the raw material defining the ceramic layer in the multilayer ceramic capacitor described above be suitably used for the ceramic to be a raw material of the ceramic slurry.

The conductive paste to be the internal electrode layer is preferably formed of a metal material such as Ni powders, a solvent, a dispersing agent and a binder, and the internal electrode pattern may be formed by printing on a ceramic green sheet by screen printing, gravure printing or other suitable method.

The thickness of the printed internal electrode pattern is preferably not less than about 0.4 µm and not more than about 0.7 µm, for example.

Examples of a method of compressing the green sheet laminate include rigid pressing and isostatic pressing.

At the time of pressing, when a resin sheet having a constant or approximately constant thickness is disposed as the outermost layer, sufficient pressure is applied to a portion including no internal electrode pattern, so that an adhesive force between the ceramic green sheets is improved.

The number of ceramic layers defining the green sheet laminate is preferably not less than 100 and not more than 1000, for example. The number of ceramic layers does not include the number of ceramic layers defining an outer layer.

Among the ceramic layers, each ceramic layer defining an inner layer preferably has a thickness of not less than about 0.5 µm and not more than about 1.0 µm, for example. The thickness of the outer layer is preferably not less than about 15 µm and not more than about 70 µm on one side, for example.

Each dimension of the laminate as described above may be measured by a micrometer, and the number of ceramic layers may be counted using an optical microscope.

Thereafter, the obtained green sheet laminate is compressed, and if necessary, cut out such that the internal electrode layer and the ceramic layer interposed between the internal electrode layers are both exposed at four places (both end surfaces and both side surfaces), and this green sheet laminate is fired under predetermined conditions to obtain a laminate. It is preferable to perform barrel polishing in which the green sheet laminate cut into a predetermined shape and a polishing agent are placed in a barrel and a corner portion and a ridgeline portion of the laminate are rounded by applying rotational motion to the barrel.

Next, a method of forming a protrusion on a laminate will be described.

The laminate prepared in the laminate preparation step further includes a protrusion in which the exposure region protrudes outward on at least one of four surfaces orthogonal or substantially orthogonal to the end surfaces.

Examples of a method of obtaining such a laminate include a method of producing a rectangular or substantially rectangular parallelepiped laminate with the use of a rectangular or substantially rectangular ceramic green sheet having no convex portion and having a shape corresponding to the protrusion, applying a masking agent to a side surface of this laminate, and then applying blasting treatment to the side surface to scrape other regions than a region to be the protrusion.

Examples of a blasting material used for the blasting treatment include steel, stainless steel, zirconia, alumina, silica, silicon carbide and the like, resin, and rubber.

The shape of the blasting material may be spherical or non-spherical.

The blasting treatment may be dry blasting or wet blasting.

As a method of forming a protrusion on a laminate, in addition to the above-described method, it is also possible to use a method of preparing a ceramic green sheet having such a shape (for example, a shape shown in FIGS. 4A and 4B) that the protrusion is formed in advance and stacking the ceramic green sheet to produce a laminate.

Although the protruding height of the protrusion is not particularly limited, it is preferably not less than about 1 µm and not more than about 10 µm, for example.

If the protruding height of the protrusion is less than about 1 µm, air bubbles are likely to be formed when a conductive paste is transferred, so that defects such as pores, pinholes, and through holes are likely to be formed in the external electrode.

On the other hand, if the protruding height of the protrusion is more than about 10 µm, the proportion of the protrusion in the whole multilayer ceramic capacitor increases, and an electrostatic capacitance per volume decreases.

The laminate including the protrusion formed thereon is a ceramic laminate of a preferred embodiment of the present invention, and the first conductive paste is transferred to the protrusion of the ceramic laminate to be fired, and thus, to form the first external electrode, such that the multilayer ceramic capacitor is obtained.

Since the ceramic laminate includes the protrusion in which the exposure region at which the internal electrode layer and the ceramic layer interposed between the internal electrode layers are both exposed protrudes, when the external electrode is formed by transferring the conductive paste, defects such as pores, pinholes, and non-through holes are not likely occur in the external electrode.

Subsequently, the transfer step of transferring the first conductive paste to the protrusion will be described.

In the transfer step, the first conductive paste is applied to a transfer jig including a groove, and the conductive paste in the groove is transferred to a surface of the protrusion.

Since a region to be transferred with the first conductive paste protrudes toward the conductive paste, even in a case in which the first conductive paste in the groove of the transfer jig is concave as in the conventional technique, a gas is prevented from being caught between the protrusion and the first conductive paste.

Accordingly, a pinhole is not likely to occur in the first external electrode formed by firing the first conductive paste.

The transfer step will be described with reference to FIG. 5.

Figure 5:
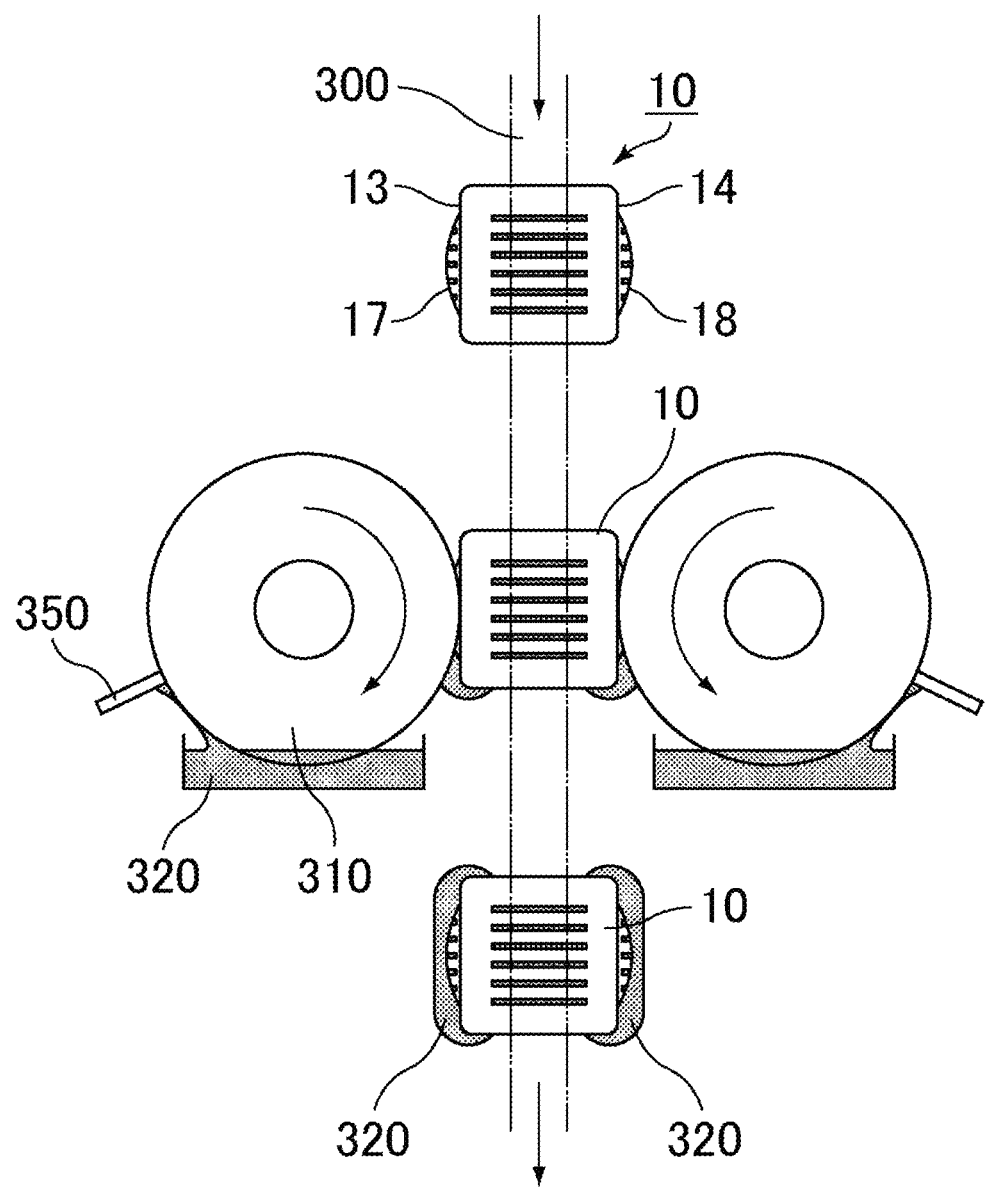
FIG. 5 is a diagram schematically showing an example of a transfer step of a method of manufacturing a multilayer ceramic capacitor according to a preferred embodiment of the present invention.

FIG. 5 is a diagram schematically showing an example of the transfer step of the method of manufacturing a multilayer ceramic capacitor according to a preferred embodiment of the present invention.

In the transfer step shown in FIG. 5, the laminate 10 fixed with a carrier tape 300 indicated by a two-dot chain line passes between transfer jigs 310 rotating in different directions. Arrows on the upper and lower sides of the carrier tape 300 indicate directions in which the carrier tape 300 and the laminate 10 move, and arrows at the central portions of the transfer jigs 310 indicate the rotating directions of the transfer jigs 310.

Figure 7A:
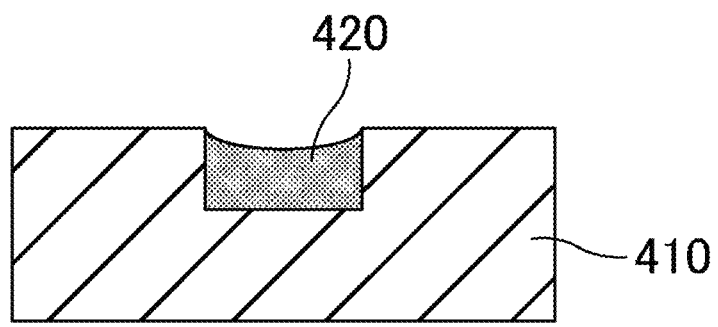
FIGS. 7A and 7B are diagrams schematically showing a conventional technique of transferring a conductive paste to a surface of a laminate by using a transfer jig having a groove.
Figure 7B:
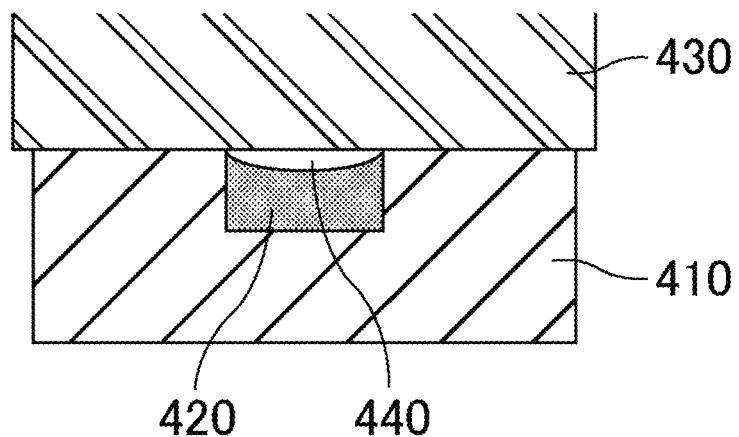

When the laminate 10 passes between the transfer jigs 310, the surfaces on which the protrusions 17 and 18 are formed come into contact with the transfer jigs 310, and the first conductive paste 320 filled in a groove on a surface of a transfer jig 310 is transferred. The transfer jig 310 is rotating in a predetermined direction, and the transfer jig 310 first comes into contact with the first conductive paste 320, so that the first conductive paste 320 adheres to the surface of the transfer jig 310 and is filled in the groove. Thereafter, the first conductive paste 320 other than one filled in the groove is scraped off by a squeegee 350. At this time, as shown in FIG. 7A, although it is considered that a recess is formed in a surface of the first conductive paste 320, the protrusions 17 and 18 are formed on the surface of the laminate 10, so that the conductive paste 320 is transferred without formation of air bubbles between the laminate 10 and the conductive paste 320.

When the surfaces of the squeegee and the transfer jig are elastic bodies, recesses tend to be formed in the surface of the conductive paste, which is more effective.

The type of the transfer jig is only required to be able to transfer the first conductive paste to the surface of the laminate, and for example, a roller including a groove may preferably be used.

The material used for the transfer jig is not particularly limited, and metal, such as stainless steel or an elastic body such as SBR rubber, urethane rubber, or silicone rubber, for example, may preferably be used.

In order to scrape off the extra first conductive paste applied to the transfer jig, a squeegee may preferably be used.

The type of the squeegee is not particularly limited, and a flat squeegee, a sword squeegee, a round squeegee, an angular squeegee, or other suitable squeegee, may preferably be used.

Although the material used for the squeegee is not particularly limited, metal, silicone rubber, acrylic resin or other suitable materials, for example, may preferably be used, and a plurality of materials may be used in combination.

It is preferable that a contact angle between the squeegee and the transfer jig is suitably set according to the viscosity of the first conductive paste, a contact condition (contact angle, speed, etc.) between the transfer jig and the laminate.

Although the depth of the groove provided in the transfer jig is not particularly limited, it is preferably not less than about 5 μm and not more than about 50 μm, for example.

The shape of the groove provided in the transfer jig is not particularly limited, and it may be a square shape, a trapezoidal shape, a U shape or other suitable shape, for example.

In the transfer step, although the first conductive paste may be transferred by bringing the transfer jig into contact with only one surface of the laminate, it is preferable that two transfer jigs are simultaneously brought into contact with two opposing surfaces to transfer the first conductive paste.

The first conductive paste includes metal and glass and, if necessary, may include a resin.

The first conductive paste preferably includes at least one metal selected from the group consisting of Cu, Ni, Ag, Pd, Ag—Pd alloy and Au, for example.

It is possible to use glass, such as B—Si based glass, B—Si—Zn based glass, B—Si—Zn—Ba based glass, and B—Si—Zn—Ba—Ca—Al based glass, for example.

By virtue of the above-described method, it is possible to obtain a multilayer ceramic capacitor includes a rectangular or substantially rectangular parallelepiped laminate including a plurality of ceramic layers and a plurality of internal electrode layers arranged in the stacking direction, and two or more exposure regions at which the plurality of internal electrode layers and the ceramic layer interposed between the internal electrode layers are both exposed and the first conductive paste layer covering at least a portion of the laminate. In the multilayer ceramic capacitor, the laminate has a cubic or substantially cubic shape including two end surfaces as longitudinal end surfaces and four surfaces orthogonal or substantially orthogonal to the end surfaces and includes, on at least one of the four surfaces, a protrusion in which the exposure region protrudes outward, and the first conductive paste layer covers the protrusion.

In the ceramic laminate, since the first conductive paste layer covers the protrusion on the side surface of the laminate, air bubbles, pinholes, through holes, and other defects are less likely to be formed between the first conductive paste and the laminate. Accordingly, a multilayer ceramic capacitor in which connection between the internal electrode layer and the external electrode is stable and reliable is able to be obtained by firing such a ceramic laminate.

A multilayer ceramic capacitor in which the first conductive paste layer is the first external electrode may be obtained by firing the obtained ceramic laminate at a predetermined temperature. The multilayer ceramic capacitor manufactured by such a method is also included as a preferred embodiment of the present invention.

Although the thickness of the first external electrode covering the protrusion is not particularly limited, it is preferably not less than about 20 μm and not more than about 50 μm, for example. The thickness of the first external electrode covering the protrusion is indicated by the maximum height from a surface where the protrusion exists.

A method of manufacturing a multilayer ceramic capacitor according to a preferred embodiment of the present invention may further include an application step.

In the application step, a second conductive paste is applied to two surfaces (a first main surface and a second main surface) orthogonal or substantially orthogonal to a surface including a protrusion (a first side surface and/or a second side surface).

In a laminate in which protrusions are formed on respective two opposing surfaces, when the application step is applied to a surface of the laminate including no protrusion, a conductive paste is applied to all four surfaces of the laminate other than the end surfaces of the laminate.

Although the order of the application step and the transfer step is not particularly limited, the application step is preferably performed before the transfer step.

This is because when the application step is performed before the transfer step, it is possible to reduce an area to which the first conductive paste is transferred in the transfer step.

At this time, it is preferable to transfer and apply the conductive paste such that the first conductive paste and the second conductive paste are in contact with each other.

When the first conductive paste and the second conductive paste are brought into contact with each other, the conductive paste is applied to annularly cover the four surfaces orthogonal or substantially orthogonal to the end surfaces of the laminate. When the conductive pastes are in contact with each other, since external electrodes after firing are electrically connected to each other, an external electrode annularly covering four surfaces orthogonal or substantially orthogonal to the end surfaces of a multilayer ceramic capacitor is formed, and the multilayer ceramic capacitor is able to be easily mounted.

As a method of applying the second conductive paste, although a method similar to that for the first conductive paste may be used, a method conventionally used to form an external electrode may preferably be used, for example.

Since an internal electrode layer is not formed on a surface to which the second conductive paste is to be applied, even if a defect such as a pinhole occurs, there is no particular problem.

That is, among the four surfaces orthogonal or substantially orthogonal to the end surfaces of the laminate, a protrusion may be formed on only the surface (side surface) at which the internal electrode layer and the ceramic layer interposed between the internal electrode layers are both exposed, and no protrusion may be formed on two surfaces (main surfaces) orthogonal or substantially orthogonal to the surface at which the internal electrode layer and the ceramic layer interposed between the internal electrode layers are both exposed.

The laminate to be subjected to the application step may be a laminate in which protrusions are formed on at least one of the four surfaces orthogonal or substantially orthogonal to the end surfaces, and may be a laminate in which the protrusions are formed on respective two opposing surfaces of the four surfaces orthogonal or substantially orthogonal to the end surfaces. However, the laminate to be subjected to the application step is preferably a laminate in which the protrusions are formed on the two opposing surfaces.

The protrusions are formed on the respective two opposing surfaces of the four surfaces orthogonal or substantially orthogonal to the end surfaces, and when the second conductive paste is applied to cover the surfaces orthogonal or substantially orthogonal to the surfaces on which the protrusions are formed, all of the four surfaces orthogonal or substantially orthogonal to the end surfaces of the laminate can be covered with the conductive paste.

Although a target surface to which the second conductive paste is applied is not a surface including the protrusion, in the application step, it is preferable to apply the second conductive paste also to the surface including the protrusion. That is, in a method of manufacturing a multilayer ceramic capacitor according to a preferred embodiment of the present invention, preferably, in the application step, the second conductive paste is applied so as to protrude from a surface, orthogonal or substantially orthogonal to the surface including the protrusion, to the surface including the protrusion, and the second conductive paste and the first conductive paste are brought into contact with each other on the surface including the protrusion, such that the four surfaces orthogonal or substantially orthogonal to the end surfaces of the laminate are annularly covered with the second conductive paste and the first conductive paste.

In the application step, when the second conductive paste is applied so as to protrude from the surface orthogonal or substantially orthogonal to the surface including the protrusion to the surface including the protrusion, in the case in which the four surfaces orthogonal or substantially orthogonal to the end surfaces of the laminate are annularly covered with the second conductive paste and the first conductive paste, a region to which the first conductive paste should be transferred is reduced, and therefore, air bubbles are less likely to be formed between the first conductive paste and the protrusion in the transfer step.

In a method of manufacturing a multilayer ceramic capacitor according to a preferred embodiment of the present invention, more preferably, the second conductive paste is in contact with the internal electrode layer at the protrusion.

When the second conductive paste is in contact with the internal electrode layer at the protrusion, the region to which the first conductive paste should be transferred is reduced, and therefore, air bubbles are less likely to be formed between the first conductive paste and the protrusion in the transfer step.

The configuration of another example of a multilayer ceramic capacitor according to a preferred embodiment of the present invention will be described with reference to FIGS. 6A and 6B.

Figure 6A:
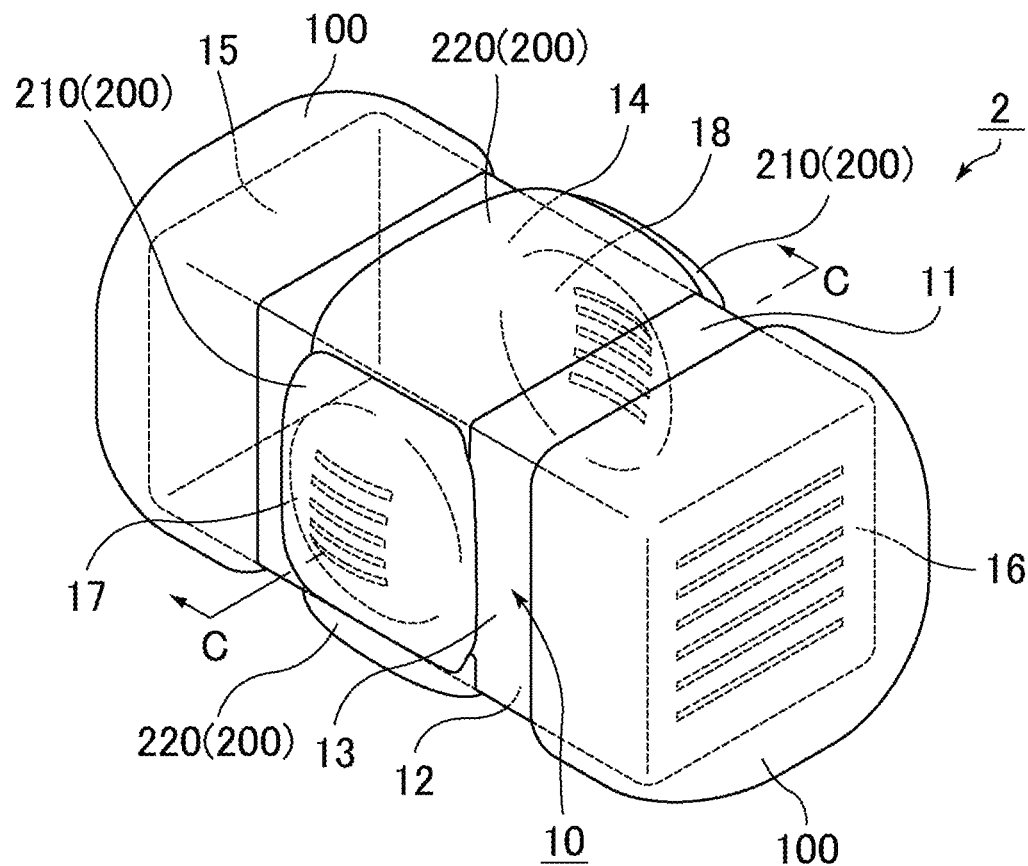
FIG. 6A is a perspective view schematically showing another example of a multilayer ceramic capacitor according to a preferred embodiment of the present invention.
Figure 6B:
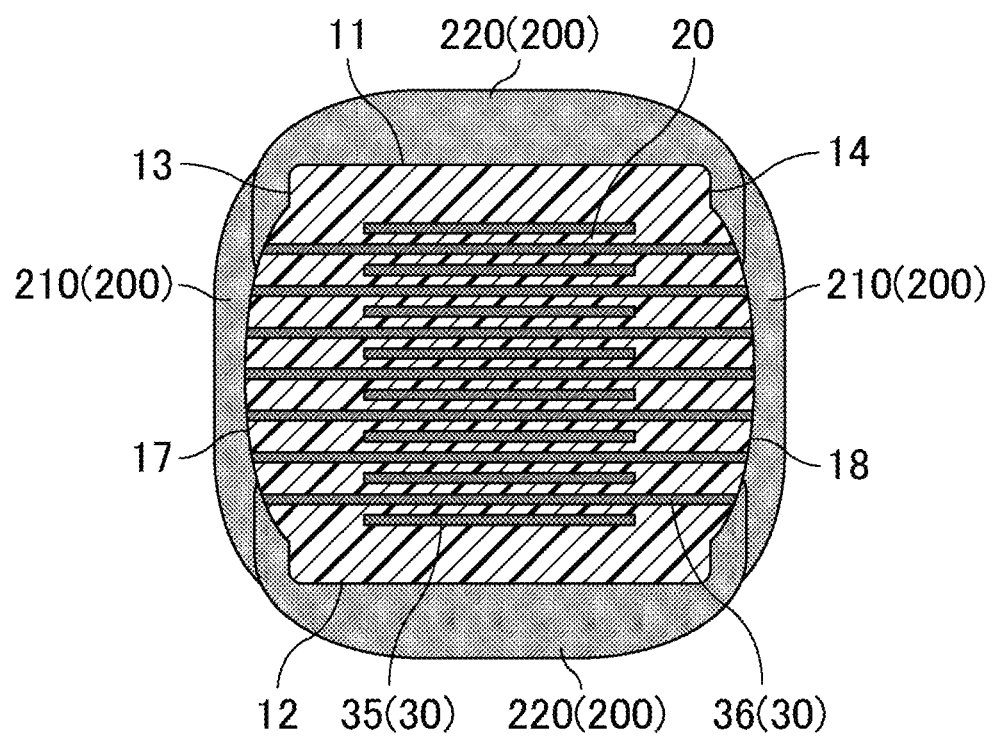
FIG. 6B is a WT cross-sectional view of FIG. 6A.

FIG. 6A is a perspective view schematically showing another example of the multilayer ceramic capacitor, and FIG. 6B is a WT cross-sectional view of FIG. 6A. FIG. 6B is also a cross-sectional view along line C-C in FIG. 6A.

As shown in FIG. 6A, longitudinal end surfaces of the laminate 10 of a multilayer ceramic capacitor 2 are covered with the external electrode 100, and an external electrode 200 annularly covering four surfaces is provided on four surfaces orthogonal or substantially orthogonal to the longitudinal direction.

As shown in FIG. 6B, the external electrode 200 is defined by first external electrodes 210, which cover the surfaces 13 and 14 including the protrusions 17 and 18 in which an exposure region at which the internal electrode layer 30 and the ceramic layer 20 are both exposed protrudes outward, and second external electrodes 220 covering the two surfaces 11 and 12 orthogonal or substantially orthogonal to the surface on which the protrusion is provided.

A portion of the second external electrode 220 is also provided on the surfaces 13 and 14 on which the protrusions 17 and 18 are provided, and the first external electrodes 210 connect the second external electrodes 220 to each other and cover the protrusions 17 and 18. The second external electrode 220 is in contact with the second internal electrode layer 36 at the protrusions 17 and 18.

Examples of a method as shown in FIG. 6B of forming the second external electrodes 220 on not only the two surfaces 11 and orthogonal or substantially orthogonal to the surfaces including the protrusions 17 and 18 but also the surfaces 13 and including the protrusions 17 and 18 include a method as described above in which in the application step, the second conductive paste is applied so as to protrude from the surface, orthogonal or substantially orthogonal to the surface including the protrusion, to the surface including the protrusion, and fired.

A method of manufacturing a multilayer ceramic capacitor according to a preferred embodiment of the present invention may include a step of forming an external electrode on the end surface of the laminate. Although a method of forming the external electrode on the end surface of the laminate is not particularly limited, a method in which a conductive paste is applied to the end surface of the laminate and fired may preferably be used.

The conductive paste for forming the external electrode at an end of the laminate is not particularly limited, and one of the first conductive paste and the second conductive paste may be used, and a conductive paste having a different composition from those of the first conductive paste and the second conductive paste may be used.

There is no particular limitation on the order of the step of forming the external electrode on the end surface of the laminate and the transfer step, and either one may be performed first.

In a method of manufacturing a multilayer ceramic capacitor according to a preferred embodiment of the present invention, a plating layer may preferably further be formed on a surface of the external electrode obtained by firing the conductive paste.

Although the composition of the plating layer formed on the surface of the external electrode is not particularly limited, it preferably includes at least one selected from the group consisting of Cu, Ni, Ag, Pd, Ag—Pd alloy, Au and Sn, for example, and two or more layers having different compositions may be stacked.

As the plating layer including two or more layers, a plating layer including a nickel plating layer (first layer) in direct contact with the external electrode and a tin plating layer (second layer) not in direct contact with the external electrode, for example, is preferable.

It is preferable that the thickness of the nickel layer is not less than about 1 μm and not more than about 8 μm, and the thickness of the tin layer is not less than about 1 μm and not more than about 8 μm, for example.

When the nickel plating layer is formed, it is possible to reduce or prevent erosion of the external electrode due to solder when the multilayer ceramic capacitor is mounted. When the tin plating layer is formed, solder wettability is improved, so that the multilayer ceramic capacitor is able to be easily mounted.

Hereinafter, examples specifically showing multilayer ceramic capacitors according to preferred embodiments of the present invention will be described. The present invention is not limited to only these examples.

Example 1

A polyvinyl butyral type binder, a plasticizer, and ethanol as an organic solvent were added to $BaTiO_3$ as a ceramic raw material, and they were wet mixed by a ball mill to produce a ceramic slurry. Then, this ceramic slurry was formed into a sheet by a lip method to obtain a rectangular or substantially rectangular ceramic green sheet. Then, a conductive paste including Ni was screen-printed on the ceramic green sheet to form an internal electrode pattern primarily composed of Ni. Then, a plurality of the ceramic green sheets including the internal electrode patterns formed thereon were stacked such that the directions in which the internal electrode layers were extended out were orthogonal or substantially orthogonal to each other, to obtain a green laminate sheet to be a capacitor body. Then, this green laminate sheet was pressure molded and divided by dicing to obtain chips. The obtained chips were heated at about 1200° C. in an $N_2$ atmosphere to burn a binder and then fired in a reducing atmosphere containing $H_2$, $N_2$ and $H_2O$ gases to obtain a sintered laminate. The structure of the laminate is a structure including a plurality of ceramic layers and a plurality of internal electrode layers.

The average thickness of the internal electrode layers was about 0.55 μm, the average thickness of the ceramic layers interposed between the internal electrode layers was about 0.65 μm, and the number of the internal electrode layers was 560.

The dimensions of the laminate were about 1.13 mm in L direction X about 0.85 mm in W direction X about 0.75 mm in T direction. An exposure region at which the first internal electrode layer and the ceramic layer interposed between the first internal electrode layers were exposed on the first end surface and the second end surface, which were end surfaces in the L direction, was formed, and an exposure region at which the second internal electrode layer and the ceramic layer interposed between the second internal electrode layers were exposed on the first side surface and the second side surface, which are end surfaces in the W direction, was formed. The length in the L direction in the exposure region of the second internal electrode layer was about 300 μm. Barrel polishing was applied to this laminate to round corners of the laminate.

Thereafter, a masking agent was applied to surfaces of the exposure regions on the first side surface and the second side surface at which the second internal electrode layer and the ceramic layer were exposed, and blasting treatment was performed using a zirconia powder, such that a ceramic laminate according to Example 1, in which protrusions were formed on the first side surface and the second side surface was obtained.

After solidifying the obtained ceramic laminate with a resin, a WT surface was polished to half the length in the L direction to expose the WT surface. The WT surface was observed at a magnification of 1000 times using a microscope, and the maximum thickness of the protrusion was measured. The same operation was performed with 10 samples, and the average value thereof was taken as the protruding height of the protrusion, so that the protruding height was about 1 μm.

Then, a mixture of copper grains and glass was dispersed in a solvent to produce a first conductive paste.

The viscosity of the first conductive paste was about 60 Pa·s.

Two rubber rollers including linear grooves with a width of about 440 µm and a depth of about 40 µm provided on the surface were prepared as transfer jigs and arranged as shown in FIG. 5. The rubber roller was in contact with the first conductive paste in the lower portion and was configured such that the first conductive paste was continuously supplied to the rubber roller by rotating. The first conductive paste supplied to the rubber roller was configured such that portions other than the groove portion were scraped off by a metal squeegee.

The two transfer jigs as described above were arranged to face each other, and while the transfer jigs were rotated in different directions, a ceramic laminate fixed to a carrier tape was passed through a gap between the rotating transfer jigs. Consequently, the first conductive paste was transferred from the transfer jig to the surface of the protrusion. Since the width of the groove in the surface of the transfer jig is larger than the length in the L direction in the exposure region of the second internal electrode layer, the exposure region of the second internal electrode layer was covered with the first conductive paste. Thereafter, firing was performed at about 850° C. to form a first external electrode.

Subsequently, the first end surface and the second end surface were immersed in a conductive paste having the same or substantially the same composition as that of the first conductive paste used in the transfer step, such that the conductive paste was applied to the first end surface and the second end surface. By firing this, external electrodes were also formed on the first end surface and the second end surface.

Thereafter, nickel plating (thickness: about 4 µm) and tin plating (thickness: about 4 µm) were applied in this order onto the external electrodes formed on the first end surface, the second end surface, the first side surface, and the second side surface.

Through the above step, the multilayer ceramic capacitor according to Example 1 was produced.

Examples 2 to 4

Multilayer ceramic capacitors according to Examples 2 to 4 were produced in the same or substantially the same procedure as in Example 1 except that the protruding height of the protrusion was changed by adjusting the time of the blasting treatment in the laminate preparation step.

Comparative Example 1

In the laminate preparation step, a multilayer ceramic capacitor according to Comparative Example 1 was produced in the same or substantially the same procedure as in Example 1 except that the blast treatment was not performed.

Comparative Examples 2 to 3

In the laminate preparation step, multilayer ceramic capacitors according to Comparative Examples 2 to 3 were produced in the same or substantially the same procedure as in Example 1 except that a masking agent was applied to a portion other than the exposure region on the first side surface and the second side surface at which the second internal electrode layer and the ceramic layer interposed between the second internal electrode layers were both exposed, and blasting treatment was performed, such that the exposure region was scraped to form a recess (the protruding height of the protrusion was made negative).

After solidifying the multilayer ceramic capacitors according to Examples 1 to 4 and Comparative Examples 1 to 3 with a resin, the WT surface was polished to half the length in the L direction to expose the WT surface. The first external electrode formed on the surface of the protrusion was observed with a microscope, and the presence or absence of air bubbles and pinholes having a diameter of not less than about 15 µm was confirmed. Among 1000 multilayer ceramic capacitors, those having air bubbles, pinholes or through holes were counted as defective products, and the percent defective was measured. The results are shown in Table 1.

TABLE 1

|  | Protruding height of protrusion [µm] | Percent defective |
| --- | --- | --- |
| Example 1 | 1 | 0.1% |
| Example 2 | 4 | 0.0% |
| Example 3 | 5 | 0.0% |
| Example 4 | 7 | 0.0% |
| Comparative Example 1 | 0 | 0.5% |
| Comparative Example 2 | −1 | 0.8% |
| Comparative Example 3 | −3 | 1.0% |

Example 5

A multilayer ceramic capacitor according to Example 5 was produced in the same or substantially the same procedure as in Example 1 except that the following application step was performed before the transfer step.

Among four surfaces orthogonal or substantially orthogonal to end surfaces of a ceramic laminate, the second conductive paste was transferred (applied) to a surface (first main surface and second main surface) having no protrusion with the use of the transfer jig used in the transfer step, and the second conductive paste was dried at about 170° C. At this time, a force with which the transfer jig pressed the laminate was adjusted, such that the second conductive paste was also applied to the surface on which the protrusion was formed. The transferred second conductive paste was in contact with the internal electrode layer defining the protrusion. The second conductive paste having the same or substantially the same composition as that of the first conductive paste was used.

Examples 6 to 8

Multilayer ceramic capacitors according to Examples 6 to 8 were produced in the same or substantially the same procedure as in Example 5 except that the protruding height of the protrusion was changed by adjusting the time of the blasting treatment in the laminate preparation step.

Comparative Example 4

In the laminate preparation step, a multilayer ceramic capacitor according to Comparative Example 1 was produced in the same or substantially the same procedure as in Example 5 except that the blast treatment was not performed.

Comparative Examples 5 to 6

In the laminate preparation step, multilayer ceramic capacitors according to Comparative Examples 5 to 6 were produced in the same or substantially the same procedure as in Example 5 except that a masking agent was applied to a portion other than the exposure region on the first side surface and the second side surface where the second internal electrode layer and the ceramic layer interposed between the second internal electrode layers were exposed, and blasting treatment was performed, such that the exposure region was scraped to form a recess (the protruding height of the protrusion was made negative).

For the multilayer ceramic capacitors of Examples 5 to 8 and Comparative Examples 4 to 6, the first external electrode was observed in the same or substantially the same procedure as in Examples 1 to 4 and Comparative Examples 1 to 3. Among 1000 multilayer ceramic capacitors, those having pores, pinholes or through holes were counted as defective products, and the percent defective was measured. The results are shown in Table 2.

TABLE 2

|  | Protruding height of protrusion [μm] | Percent defective |
|---|---|---|
| Example 5 | 1 | 0.2% |
| Example 6 | 4 | 0.0% |
| Example 7 | 5 | 0.0% |
| Example 8 | 7 | 0.0% |
| Comparative Example 4 | 0 | 0.9% |
| Comparative Example 5 | −1 | 1.5% |
| Comparative Example 6 | −3 | 2.0% |

From the results of Tables 1 and 2, it was confirmed that the occurrence of defects such as air bubbles, pinholes, and through holes in the external electrode is reduced or prevented according to methods of manufacturing multilayer ceramic capacitors according to preferred embodiments of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    a rectangular or substantially rectangular parallelepiped laminate including a plurality of ceramic layers and a plurality of internal electrode layers arranged in a stacking direction and including two or more exposure regions at which the plurality of internal electrode layers and the ceramic layer interposed between the internal electrode layers are both exposed; and
    a first external electrode covering at least a portion of the laminate; wherein
    the laminate has cubic or a substantially cubic shape including two end surfaces, which are longitudinal end surfaces, and four surfaces orthogonal or substantially orthogonal to the end surfaces; and
    on at least one of the four surfaces, the laminate includes a protrusion in which the exposure region protrudes outward, and the first external electrode covers the protrusion.

2. The multilayer ceramic capacitor according to claim 1, wherein
    second external electrodes are provided respectively on two surfaces orthogonal or substantially orthogonal to the surface including the protrusion; and
    the first external electrode is disposed such that the second external electrodes on two opposing surfaces are electrically connected.

3. The multilayer ceramic capacitor according to claim 2, wherein a portion of the second external electrode is provided on the surface including the protrusion, and in the protrusion, the second external electrode is in contact with the internal electrode layer.

* * * * *